G. C. SCHEMMEL.
ACETYLENE WELDING APPARATUS.
APPLICATION FILED JULY 29, 1912.

1,072,655.

Patented Sept. 9, 1913.

Witnesses
Fenton S. Belt
J. H. Sherwood

Inventor
George C. Schemmel
By Franklin H. Hough
Attorney

UNITED STATES PATENT OFFICE.

GEORGE C. SCHEMMEL, OF WAPAKONETA, OHIO.

ACETYLENE WELDING APPARATUS.

1,072,655.  Specification of Letters Patent.  Patented Sept. 9, 1913.

Application filed July 29, 1912. Serial No. 712,131.

*To all whom it may concern:*

Be it known that I, GEORGE C. SCHEMMEL, a citizen of the United States, residing at Wapakoneta, in the county of Auglaize and State of Ohio, have invented certain new and useful Improvements in Acetylene Welding Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in torches for use in connection with oxy-acetylene generating apparatus and comprises a simple and efficient device of this nature having various details of construction and combinations and arrangements of parts which will be hereinafter fully described, shown in the accompanying drawings and then specifically defined in the appended claim.

My invention is illustrated in the accompanying drawings, in which:—

Figure 1:
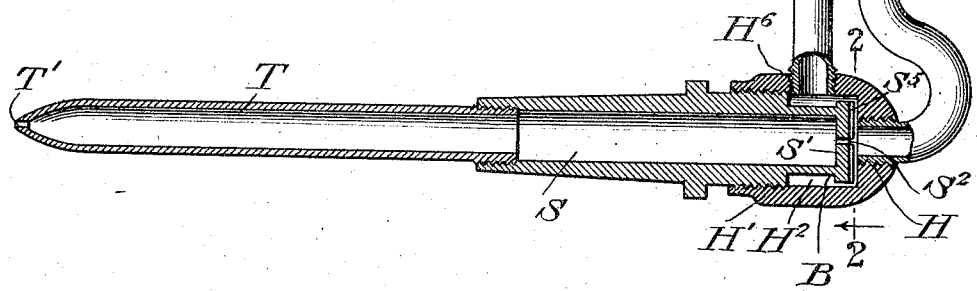
Figure 2:
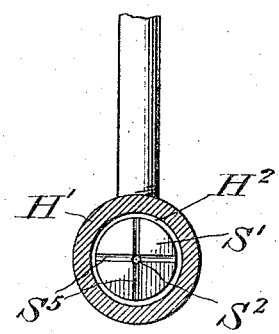

Figure 1 is a central longitudinal sectional view through the invention, and Fig. 2 is a sectional view on line 2—2 of Fig. 1.

Reference now being had to the details of the drawings by letter, S designates a mixing chamber which has a closed end S' with a nozzle opening $S^2$ therein, affording a means of communication into and space intermediate the inner end of said mixing chamber and the shell H' which is interiorly threaded and engages a threaded portion of said mixing chamber. The end of the shell is provided with a threaded aperture H for attachment to the pipe through which acetylene gas may be introduced to the shell before passing into the mixing chamber. Another threaded aperture $H^6$ is formed in the wall of the shell and to which another pipe is adapted to be connected to receive oxygen. The circumference of the mixing chamber is provided with an annular groove B, forming a space $H^2$ which communicates with the space intermediate the end of the mixing chamber and the end wall of the shell. Upon reference to Fig. 2 of the drawings, it will be noted that intersecting grooves $S^5$ are formed in the outer surface of the end of the mixing chamber and which communicate with the surrounding space.

A nozzle tube T is fitted within the inner end of the mixing chamber S and has a pointed end with an aperture T' therein.

By the provision of a blow pipe embodying the features of my invention, it will be noted that the gases may be introduced into the shell and thoroughly mixed before being ignited at the nozzle tip.

What I claim to be new is:—

An oxy-acetylene welding blow pipe comprising a mixing chamber having interiorly formed threads in the end thereof, a shell, threaded upon its inner surface and provided with apertures, one leading through the end of the shell and the other the circumference thereof, pipes fitted in said apertures and adapted to convey oxygen and acetylene gas to said mixing chamber, the circumference of said mixing chamber having an annular groove, the wall of which is apertured, the inner end of said mixing chamber being spaced apart a slight distance from the inner end of the shell and provided with radially disposed grooves with an opening at the point of intersection of said grooves extending into the mixing chamber, a slight space intervening between the inner end of the mixing chamber and the surrounding wall of the chambered portion of said shell, a nozzle fitted to the interiorly formed threads in the end of said mixing chamber, as set forth.

In testimony whereof I hereunto affix my signature in the presence of two witnesses.

GEO. C. SCHEMMEL.

Witnesses:
LEWIS STOUT,
HARRY H. LOTH.

Copies of this patent may be obtained for five cents each, by addressing the "Commissioner of Patents, Washington, D. C."